March 29, 1966     F. E. NULL ETAL     3,242,683
PRODUCTION AND STORAGE OF FREE RADICAL AND MOLECULAR HYDROGEN
Filed Sept. 12, 1963     5 Sheets-Sheet 1

INVENTORS
FAY E. NULL
CARL KYSELKA
BY
ATTORNEYS

March 29, 1966     F. E. NULL ETAL     3,242,683
PRODUCTION AND STORAGE OF FREE RADICAL AND MOLECULAR HYDROGEN
Filed Sept. 12, 1963     5 Sheets-Sheet 5

INVENTOR.
FAY E. NULL
CARL KYSELKA
BY
ATTORNEYS

United States Patent Office 3,242,683
Patented Mar. 29, 1966

3,242,683
PRODUCTION AND STORAGE OF FREE RADICAL AND MOLECULAR HYDROGEN
Fay E. Null, Shalimar, and Carl Kyselka, Fort Walton Beach, Fla., assignors to the United States of America as represented by the Secretary of the Air Force
Filed Sept. 12, 1963, Ser. No. 308,605
8 Claims. (Cl. 62—40)

The invention described herein may be manufactured and used by and for the Government for governmental purposes without the payment to either of us of any royalties thereon.

This invention concerns an apparatus and a method for the production and the storage of high concentration free radicals, represented illustratively by solid state atomic hydrogen laminated with molecular hydrogen for use as a propellant in projecting satellites into orbit, as a high explosive, and the like.

The detonation velocity and the brisance or the shattering effect of high explosives determine the functional values of the explosives.

The objects of the present invention are to provide an apparatus, a process and a technique for laminating an atomic element with a molecular element, using hydrogen as the illustrative element, in the production and in the storage of high concentrations of free radicals.

Other objects are to provide a high explosive of unusual power, an improved satellite propellant, and the like.

The absolute, thermodynamic, or the Kelvin scale of temperatures, is based on the average kinetic energy per molecule of a perfect gas. The complete absence of heat and motion is the zero temperature of the Kelvin scale and is 273.16° C. below the 0° C. of frozen water.

Helium melts at 1.0° K. and boils at 4.2° K. Hydrogen melts at 14.02° K. and boils at 20.4° K. Oxygen melts at 54.8° K. and boils at 90.2° K. Nitrogen melts at 63° K. and boils at 77° K.

This invention discloses an apparatus and a method for depositing on a surface, a solid state monolayer of molecular hydrogen and then a solid state monolayer of atomic hydrogen in the potential wells of the molecular hydrogen, and scraping the molecular-atomic lamination of hydrogen as a solid matrix product, off of the deposition surface, for its use as a propellant of satellites, as an explosive of high detonation velocity and brisance or shattering effect, and the like.

The hydrogen free radical in a medium concentration, offers a unique opportunity to obtain research insight into the role of the free radical in making determinations of the detonation velocity and the brisance of explosives. The hydrogen free radical has one of the requirements of an effective explosive or propellant and that is a reaction with the liberation of a large quantity of energy. The energy liberated in the reaction $H+H \rightarrow H_2$ is 51,500 calories per gram as compared with the energy liberated in the reaction $H_2 + \frac{1}{2} O_2 \rightarrow H_2O$ of 3,180 calories per gram.

The brisance of an explosive may be independent of the magnitude of the energy liberated, depending in a complex manner upon the chain reactions that are involved. A single link of the chain reaction may act as a bottleneck to delay the speed of formation of the end product, and thus to decrease the power expended, and to degrade the explosive performance.

According to the precursor theory advanced by Fred Howard, Jr., of the Eglin Air Force Base, Florida, powerful explosives have a precursor wave of fast particles that precede the detonation wave, and one of its effects is to dissociate some of the molecules of the explosive to form free radicals. This precursor formation of free radicals may short out some of the bottlenecks in the chain reaction permitting direct chemical reactions, and the high velocity detonation wave that characterizes the high explosive.

The direct recombination of free radicals would not be prevented by a complicated chain reaction, and with similar concentration and density to that of a conventional high explosive, should produce a higher brisance. It is well-known that a high detonation velocity depends upon a high density, and that concentrations of the hydrogen-free radical of around 1% do not show any evidence of an explosion. It is, therefore, necessary to produce the hydrogen-free radical in a relatively high concentration.

According to the teachings of John M. Flournoy of the Aero Jet General Corporation, low concentrations of the free-hydrogen radical are readily produced either by the trapping of gaseous radicals or by the irradiation of materials at low temperatures.

The basic problem in producing concentrations of the hydrogen-free radical, exceeding 1 mole percent in a solid matrix, involves heat dissipation. For example, when a free radical from an electrical discharge is trapped on a plate at 4.2° K. which, as previously stated, is the boiling point of helium, the heat of sublimation and the kinetic energy of the free radical must be dissipated on a collecting surface. As the hydrogen deposited in the solid state is a poor heat conductor with a low specific heat, the solid surface rises in temperature until the rate of recombination of atomic hydrogen into molecular hydrogen is approximately equal to that of its deposition on the solid surface.

John M. Flournoy suggests methods for overcoming this difficulty, such as, the exceedingly slow deposition from the gas phase or the precooling of the gas atoms and molecules before being trapped. It appears that precooling of the gas atoms and molecules should be practice in any event, but it does not get rid of the heat of sublimation.

An extremely slow rate of deposition of hydrogen atoms and of hydrogen molecules properly permits a higher concentration of atomic hydrogen, but in practice it would require the deposition in a vacuum of $10^{-5}$ or $10^{-6}$ millimeters of mercury. The collection of an appreciable amount of hydrogen-free radicals would be a long operation unless techniques were developed to use very large condensing surfaces.

At the temperature of liquid helium, which boils at 4.2° K., collision of gaseous hydrogen atoms on a solid surface of deposition, might not be entirely prevented so that some recombination would occur, the excess energy of the combining pairs being given to the crystal lattice in the form of vibrational energy. Even a small percentage of recombination would greatly augment the heats of cooling and condensation, and a high concentration of atomic hydrogen, even though it be at a low density, would give up entirely too much heat to be transmitted through a thick, solid layer and trapped atomic hydrogen would no longer be stabilized.

The practical solution to the above problem of heat dissipation, as disclosed herein, is by the alternate deposition of monolayers of atomic hydrogen and molecular hydrogen, with a mechanical scraping off of the composite layer before it is thick enough to impede the escape of heat to the metal wall maintained at the boiling point of natural helium which is 4.2° K.

Figure 1:
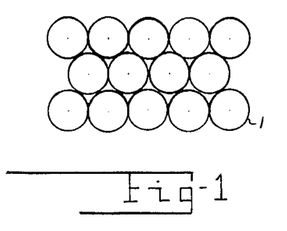
FIG. 1 is a configuration representing a monolayer of molecular hydrogen.
Figure 2:
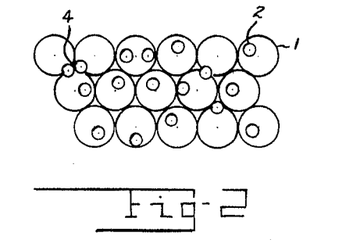
FIG. 2 is a configuration representing the monolayer of molecular hydrogen molecules in FIG. 1 with hydrogen atoms adhering in random positions at which the hydrogen atoms hit the monolayer of hydrogen molecules.
Figure 3:
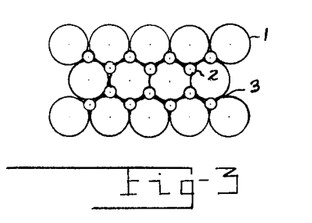
FIG. 3 is a configuration of the monolayer of hydrogen molecules in FIG. 1 with hydrogen atoms applied to the potential wells between the hydrogen molecules.

In FIG. 1 of the accompanying drawings is shown a monolayer of molecular hydrogen molecules 1. It is not known whether the hydrogen atoms 2 will stick where they hit on the molecules 1 of hydrogen, as represented in FIG. 2 of the drawings, or whether they will migrate short distances over the solid surface to positions of minimum potential, such as are represented in FIG. 3 of the drawings. At the boiling point of helium, 4.2° K., it is also not known to what degree of separation atoms of hydrogen will remain on the substrate without collision and recombination into molecules, as is represented at 4 in FIG. 2 of the drawings.

In the publication, Physics Today, vol. 11, pages 14–16, published in February 1958, Professor Davidson presents some evidence of the diffusion of free radicals for at least a few molecular diameters in an inert solid matrix which, it may be presumed, permits hydrogen atoms to seek out positions of minimum potential.

This general theorization is presented in FIGS. 1 to 3, inclusive, of the accompanying drawings. In FIG. 3, free radical hydrogen atoms 2 are presumed to migrate to positions of minimum potential at interspacial positions 3 between the hydrogen molecules 1. The configuration in FIG. 3 is taken to be symbolic of the actual lattice structure involved. Hydrogen atoms in bulk may be assumed to form a body-centered, cubic lattice structure.

Thin layers of hydrogen atoms are influenced by the structure of the substrate, so that successive monolayers of different substances may be assumed to be influenced most by two-dimensional geometry.

On the other hand, if the atomic hydrogen 2 sticks where it hits on the molecular hydrogen layer, as it is illustrated in FIG. 2 of the drawings, a random distribution results. In this latter situation, some of the atomic hydrogen may be assumed to hit closely enough together to collide and recombine, as is represented at 4 in FIG. 2. It is believed, however, that due to the small size of the hydrogen atom 2 as compared with the hydrogen molecule 1, collisions of this type would be relatively rare and the heat of recombination would be readily carried off through the thin structure of molecular and atomic monolayers of hydrogen.

The arrangement in FIG. 3 would appear to be preferable, depending upon the depth of the potential wells at the position 3, as compared with the vapor pressure of atomic hydrogen at 4.2° K., and the resultant resistance to collision and to recombination. The configuration in FIG. 2 is favored as it decreases the available surface migration time of atomic hydrogen with a shorter time interval between the deposition of atomic and molecular layers.

Figure 4:
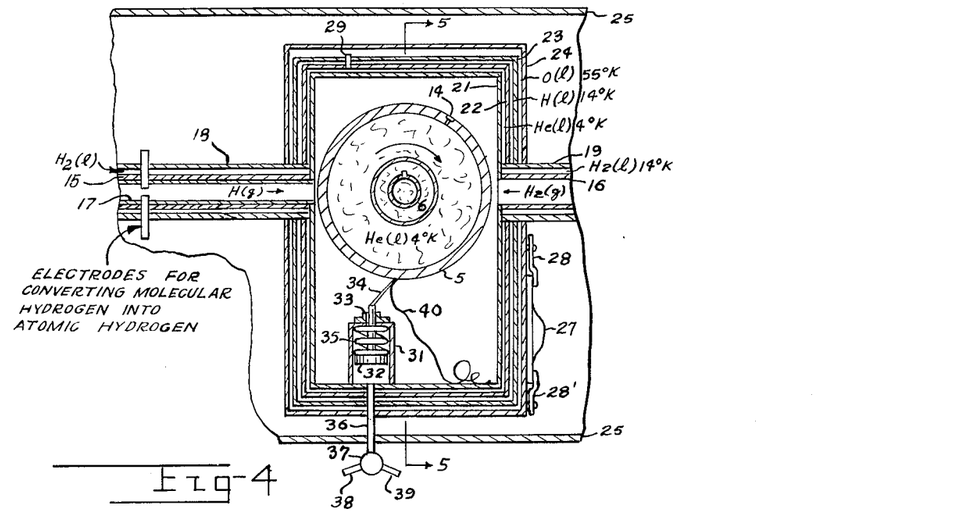
FIG. 4 is a sectional view, partly diagrammatic, of an apparatus that embodies the present invention and for making the product that is of interest herein.
Figure 5:
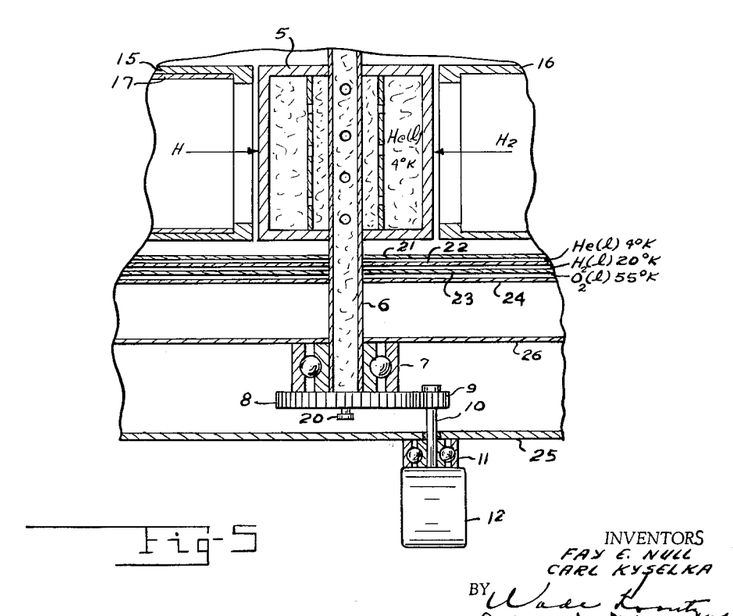
FIG. 5 is a fragmentary view, partly in section, taken about along the line 5—5 of FIG. 4.

An apparatus for obtaining a high concentration of atomic hydrogen is shown in FIGS. 4 and 5 of the accompanying drawings. The apparatus is used in accomplishing the deposition of alternate monolayers of atomic and molecular hydrogen on the surface of a rotating drum 5 that is maintained at the 4.2° K. temperature of liquid helium. The hollow drum 5 is mounted on the hollow shaft 6. The shaft 6 is journalled in suitable bearings 7 and is turned by the gear 8. The gear 8 is meshed with a smaller gear 9, driven by the shaft 10 supported in the bearing 11, by the motor 12.

Atomic hydrogen passes through the channel 15 to the surface of the cylinder 5. Molecular hydrogen passes through the channel 16 to the surface of the cylinder 5.

The combination of atomic hydrogen to form molecular hydrogen within the channel 15 is minimized by a very small layer 17 of plasma sprayed silicon dioxide which is poisoned in a suitable manner by a trace of solidified oxygen, solidified water, or the like. This practice is in conformity with the teachings of R. W. Wood of the Johns Hopkin University expressed in his article entitled "Atomic Hydrogen and the Balmer Series Spectrum" in the Philosophical Magazine 6 SER vol. 44, published in 1922. K. E. Shuler and K. J. Laider in their article in the Journal of Chemical Physics, vol. 17, page 1356, published in 1949, state that at 90° K., which is the boiling point of liquid oxygen, a coating of ice reduced the recombination rate of hydrogen atoms by a factor of $10^3$ to $10^4$.

Both of the channel walls 15 and 16 are provided with externally disposed cooling jackets 18 and 19, respectively, beneath or through which jacketed compartment liquid hydrogen flows at 20° K., at which temperature the molecular hydrogen does not condense out. Atomic hydrogen has a higher vapor pressure than molecular hydrogen and also does not condense out on the walls of the channel 15.

The drum 5 contains liquid helium which maintains its surface temperature at approximately 4° K. The liquid helium is fed into the hollow, steel drum 5 through apertures shown in the hollow fused quartz axle or shaft 6 from a fill plug 20 at the end thereof, where the shaft is turned by the gear 8. The fused quartz axle 6 preferably is journalled in Invar bearings.

The hollow drum 5 is enclosed within a desired plurality of progressively temperature lowering jackets, such illustratively as the jackets 21 to 24, inclusive, that are illustrated in FIGS. 4 and 5. The space between the inner jacket 21 and the jacket 22 is filled with continuously circulating liquid helium that is maintained at the temperature of about 1 to 4° K. The space between the jacket 22 and the jacket 23 contains continuously circulating liquid hydrogen maintained at the temperature of about from 14–20° K. Liquid oxygen is circulated between the jackets 23 and 24 that are maintained at the temperature range of from 55–90° K. The jacket walls are good thermal insulators, each wall having a composite structure, as vacuum between layers of glass, or glass wool separated by aluminum foil. Apparatus support is indicated by the partition 26. The whole assembly is enclosed within a vacuum chamber wall 25 within which is maintained a vacuum of about $10^{-5}$ to $10^{-6}$ of mercury.

Within the jacket 21 that encloses the drum 5, and attached to the interior of the jacket 21, is a cylinder 31 that encloses a piston 32. The piston 32 is connected through a thrust member passing through a piston cap 33, with a knife blade 34. The knife blade 34 edge is of the same length as the axial length of the drum 5 and releasably makes scraping engagement with the surface of the drum for stripping the film therefrom.

The piston 32 is loaded downwardly by the coil spring 35. The piston 32 is actuated by helium gas or liquid pressure supplied from the pipe 36 under the control of the valve 37. The helium gas is supplied to the valve 37 from the supply pipe 38 and is released through the discharge pipe 39. The helium gas applies pressure against the piston 32 to compress the coil spring 35 and to apply the edge of the knife blade 34 against the surface of the rotating cylinder 5. The application of the edge of the blade 34 to the full axial length of the surface of the cylinder 5 removes the laminations of atomic hydrogen and molecular hydrogen in their solid states therefrom as product, of laminated mosaic structure.

The composite layer product 40 that is removed by the edge of the blade 34 from the surface of the cylinder 5 accumulates within the compartment that is provided by the jacket 21 from which it is removed by the operation of the door 27 that slides laterally under the guides 28 and 28'. The blade 34 is disengaged from the surface of the drum 5 by operating the valve 37 to exhaust the pre-cooled helium gas through the exhaust pipe 39. The helium gas or helium liquid is maintained at a low temperature to minimize heat flow toward the drum 5.

The pressure of the atomic hydrogen within the channel 15 for the deposition of a monolayer on the drum 5 illustratively is estimated to be $5.8 \times 10^{-7}$ millimeters of mercury. A composite layer that is a tenth of a millimeter thick is estimated to consist of 425,000 monolayers. A preferred velocity of the drum 5, traveling at 3,000 feet per second and with a slit 10 centimeters wide, with an estimated time of transit of $1.09 \times 10^{-4}$ seconds, permits the accumulation of the composite film product 40 of a thickness of a tenth of a millimeter in 46.4 seconds, with an annual production for each apparatus of about 20 tons of explosive or propellant.

Since the peripheral surface of the cylindrical drum 5 is cooled by liquid helium that is pressed against the inside surface of the drum 5 by centrifugal force, it is estimated that the tensile strength of the steel drum 5 should be in the order of 300,000 lbs. per square inch with a preferable surface velocity of about 1,330 feet per second. The peripheral strength of the steel may be augmented by being wrapped with fine wire without impairing the conduction of the heating condensation through the drum surface to the liquid helium disposed inwardly of the drum 5. It is estimated that the wire-wrapped drum would withstand twice the tensile strength of an unwrapped drum.

It is preferred that the shaft 6 be made of fused quartz to minimize the conduction of heat thereby. The shaft 6 bearings illustratively are made of Invar metal that is coated with powdered graphite. The assembly throughout is constructed of material that minimizes heat flow.

In FIGS. 6 to 12, inclusive, of the drawings, are shown modifications of the apparatus that is shown in FIGS. 4 and 5. The modifications comprise broadly a rigidly mounted, flat, film matrix product deposition plate that replaces the cylindrical drum 5 in FIGS. 4 and 5; means for producing sequential pulsations of atomic hydrogen and of molecular hydrogen gases conducted by a single channel instead of the two channels in FIG. 4; means for delivering the gaseous pulsations for their solidification and deposition as sequential laminations as a matrix product on the surface of the deposition plate; and supplemental apparatus. The single channel conducted pulsations of atomic hydrogen and of molecular hydrogen applied to the rotatable drum 5 applies a solidified matrix thereto, as a laminated mosaic.

Figure 6:
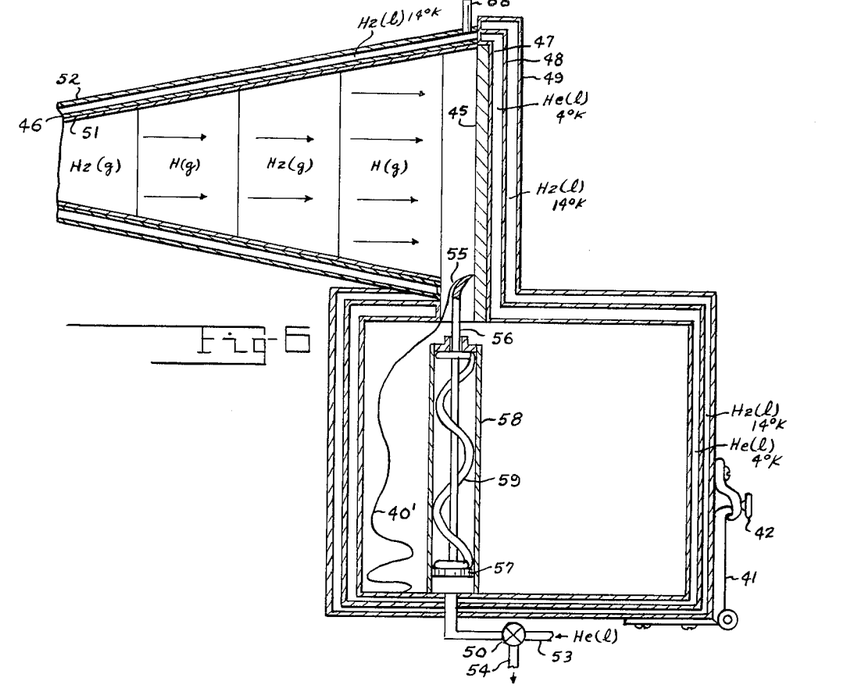
FIG. 6 is a fragmentary view partly in section, and partly diagrammatic, of a first modification of an apparatus that embodies the present invention, for making the product that is described herein.

In FIG. 6 of the accompanying drawings, is shown a first modification wherein alternate pulsations or waves of atomic hydrogen and of molecular hydrogen from a wall-cooled expansion nozzle 46 are successively applied to the surface of a rectangular, flat, stationary deposition plate 45. The stationary deposition plate 45 is maintained at the temperature 4° K. by liquid helium that is positioned between the jackets 47 and 48 that are mounted immediately back of the plate. The pair of jackets 48 and 49 define a compartment within which liquid hydrogen at about 14° K. is continuously circulated. Additional jackets for providing stepped temperature control, as in FIG. 4, are available as desired.

The interior surface of the expansion nozzle 46 is coated with a very thin layer of silicon dioxide that has been sprayed thereon, to which is added water vapor, phosphoric acid or oxygen that serves to prevent the recombination of atomic hydrogen into molecular hydrogen. A jacket 52 is disposed outside the expansion nozzle 46 to provide a thin compartment through which is circulated liquid hydrogen at the temperature of 14° K. The jacket 52 may be augmented by additional cooling jackets as desired.

Solidified alternated laminations of atomic hydrogen and of molecular hydrogen are removed from the surface of the flat, square or rectangular deposition stationary plate 45 by a suitable means, such as by the knife blade 55. The knife blade 55 is of the length corresponding to the width of the surface of the stationary, flat deposition plate 45, as shown primed in FIG. 11 and double-primed in FIG. 12.

The knife blade 55 extends laterally of, is normal to, and is actuated by a piston rod 56. The piston rod 56 terminates downwardly in a piston 57 that reciprocates within a cylinder 58. The piston 57 is spring-loaded downwardly by operation of the coil spring 59. The edge of the knife blade 55 serves to remove sheets of solidified composite layers of atomic hydrogen and of molecular hydrogen product 40' from the surface of the deposition stationary plate 45 by the operation of the valve 50.

When the composite layer on the deposition plate 45 reaches the desired thickness, the knife scraper 55 is caused to move upwardly of the deposition plate by the admission of cooled gaseous or liquid helium through the valve 50 supplied by the inlet pipe 53. The liquid helium is applied to the lower surface of the piston 57 within the cylinder 58 and compresses the spring 59 until the knife blade 55 reaches the top of the deposition plate 45, during which travel the sheet of the atomic hydrogen and molecular hydrogen laminate matrix product 40' is sheared from the deposition surface of the plate 45 and accumulates within the container below the plate 45. The removal of the laminate from inside of the device is accomplished through a suitable door 41 that is hinged at one edge and that is released by the operation of the catch 42.

Upon the knife blade 55 reaching the upper extremity of its travel, the spring 59 expands against the upper side of the piston 57 returning it to the lower end of the cylinder 58 in response to the adjustment of the valve 50, causing the liquid helium to drain away through the outlet pipe 54. This process is repeated at sufficient intervals determined by the thickness of the deposition of the lamination of atomic hydrogen or molecular hydrogen accumulated on the deposition plate 45.

Figures 7, 10, 11:
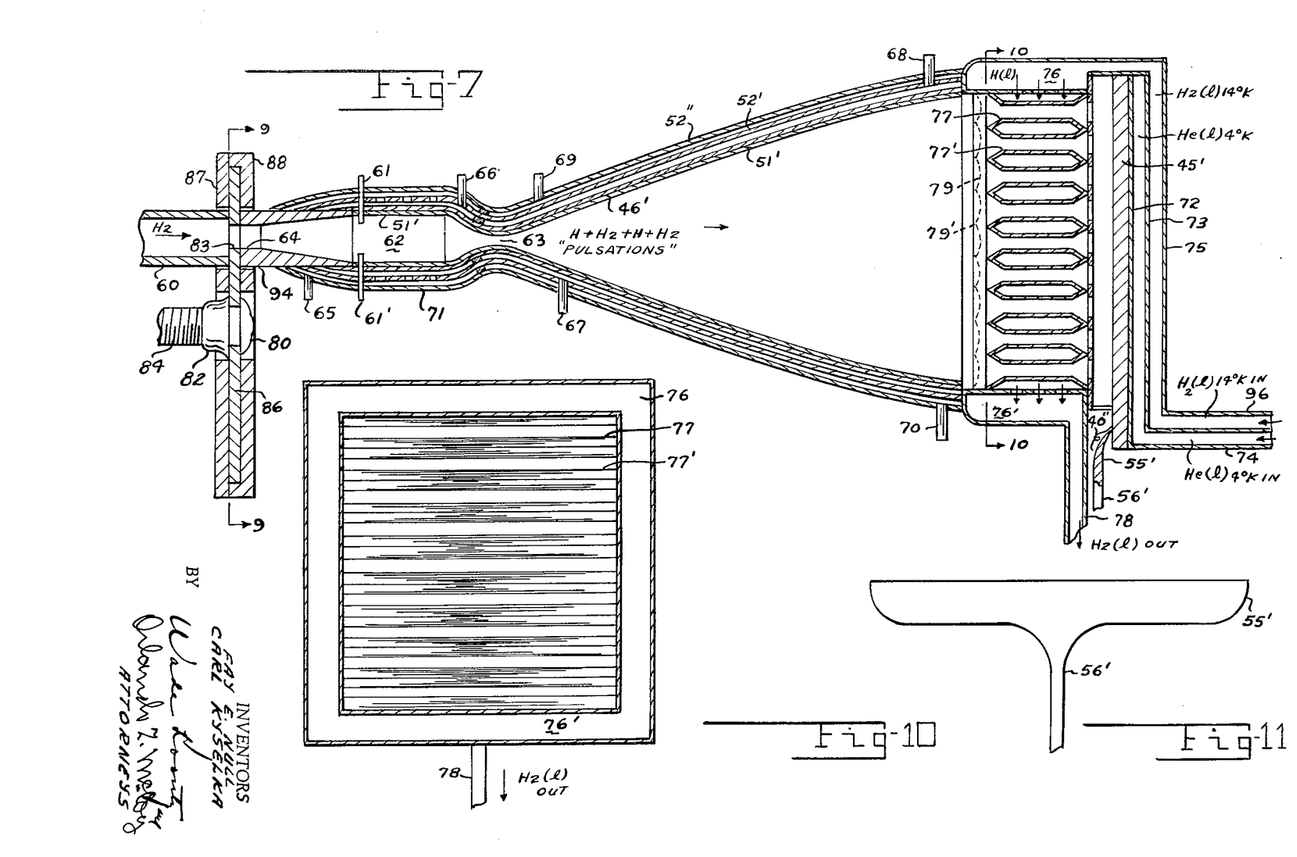
FIG. 7 is an axial section view of a single stage precooler, second modification of the apparatus for making the desired product.
FIG. 10 is an elevational view, partly in section, taken along the line 10—10 of FIG. 7.
FIG. 11 is an elevational view of the film scraping knife in FIGS. 6, 7 and 12.
Figure 8:
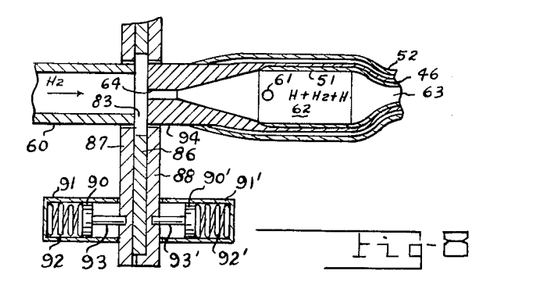
FIG. 8 is a fragmentary axial sectional view of the sequential atomic hydrogen and molecular hydrogen pulse making part of the apparatus in FIG. 7, displaced a one-fourth turn on its axis.
Figure 9:
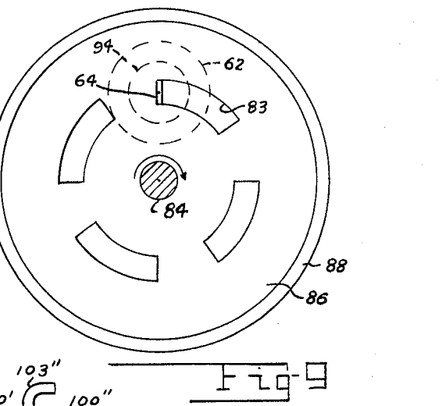
FIG. 9 is a sectional view taken along the line 9—9 of FIG. 7.

In the device that is shown in FIGS. 7, 8 and 9 of the drawings, gaseous hydrogen is admitted from the hydrogen supply pipe 60 at a flow rate that is adjusted to its rate of conversion into its end product 40". The gaseous hydrogen passes through a hydrogen metering valve and then between a pair of electrodes 61 and 61' that are alternately energized and de-energized. Each time a spark passes between the adjacent tips of the electrodes 61 and 61' an estimated 94.7% by weight of the molecular hydrogen between the electrode tips is converted into atomic hydrogen with a temperature increase of about 5,000° K. As a result, alternate pulses of atomic hydrogen and molecular hydrogen pass to the right of the spark chamber 62 through the throat 63 and are conducted along the expansion nozzle 46 toward a preferred precooling unit at diminishing rates of flow and temperature until they sequentially arrive at the deposition plate 45' with a minimum velocity. Atomic hydrogen for commercial use is obtained by directing a jet of hydrogen gas at right angles to a hydrogen arc. The molecular hydrogen metering valve provides apparatus for imparting alternating pulsations of atomic and molecular hydrogen that are fed into the spark chamber 62.

The spark chamber 62 is provided with a water jacket 71 through which cold water flows between the connections 65 and 66. The wall of the expansion nozzle 46 is provided with a desired sequence of coolant compartments for circulation through pairs of connections 67 and 68, 69 and 70, and the like, such as water, liquid oxygen, liquid nitrogen, liquid hydrogen, or the like.

The expansion nozzle 46 is of adequate dimension axially to permit the desired temperature reduction from 5,000° K. at the arc between the electrodes 61 and 61' to the arrival of the gas at the deposition plate 45 in FIG. 6 or 45' in FIG. 7, or at one of the precoolers in FIG. 7 or FIG. 11. However, the velocity of the gas is then very high, and the precoolers absorb the corresponding excess kinetic energy before impact on the deposition plate.

The expansion nozzle 46 is designed to deposit on the plate 45 the amount of gas in the pulse in a uniform monolayer, the gas at its mouth being in the transition range between slip flow and free molecular flow. The hydrogen gas expansion is adequate for providing a widely dispersed, low density, fairly uniform flow of gas. The density of the pulse jet trails off as it approaches the plate on which it is to be deposited, due to the method of the pulse production and through the use of the equipment shown in FIGS. 6 to 12, inclusive, of the drawings. At the deposition surface of the plate 45, the pulse density is substantially uniform in the direction that is parallel to the surface of the deposition plate.

The metering valve for supplying hydrogen to the spark chamber 62 that is shown in FIGS. 7, 8 and 9 of the accompanying drawings, is designed for high-speed operation. The hydrogen metering valve comprises a rotating disc 86 that is positioned between a pair of non-rotating plates 87 and 88 using powdered graphite therebetween as lubricant. The rotating disc 86 has a fill port 83 that is adjacent to its peripheral edge. The rotating disc 86 is mounted upon the end of a shaft 84 to which the disc is secured in the usual manner between the bolt head 80 and the screw nut 82. The stationary plate 87 is adapted for being slidable axially along the end of the hydrogen supply tube 60 under the urging of suitable means such as the spring-loaded piston 90 in the cylinder 91. In a similar manner, the other stationary plate 88 is slidable axially along the extension 94 at the left-hand end of the spark chamber 62. Both plates 87 and 88 are springpressed axially against the rotating plate or disc 86. The axial pressure is applied by a spring 92 that maintains a thrust bar 93 in engagement with the stationary plate 87 as by seating in an aperture therein as shown. A similar arrangement applies axial pressure to the plate 88 as shown in FIG. 8 with the parts primed. In both instances, the cylinders 91 and 91' are secured in position. As a result, the rotating plate 86 is continuously compressed axially between the two plates 87 and 88 with the assembly serving as a hydrogen conducting and pulsing valve.

The overall apparatus is designed to accomplish a uniformly tapering expansion of the gas with a continuous separation front between the molecular and the atomic hydrogen gas pulsations.

In the apparatus that is illustrated in FIGS. 7, 8 and 9 of the accompanying drawings, the entrance slit 64 into the spark chamber 62 is dimensioned such that the fill port 83 in the rotating disc 86, that is positioned between the stationary plates 87 and 88, is about ten times longer than the entrance slit 64, such that the time spent during the passage of the front or lead edge of the fill port 83 in passing across the hydrogen entrance slit 64 is small as compared with the time the fill port 83 is open and, such that the time for the rear edge of the fill port 83 to cross the entrance slit is quite short. For most of the open time of the fill port 83, the flow of gas is uniform.

The single stage precooler than is shown in FIG. 7 of the accompanying drawings is attached to the discharge end of the expansion nozzle 46' to receive the alternated atomic hydrogen and molecular hydrogen pulsations therefrom prior to their arrival at the deposition plate 45'.

The expansion nozzle 46' in FIG. 7 is of frusto-conical shape. The expansion nozzle may terminate at its discharge righthand end in a circular section, in a square section, or in a rectangular section, as preferred, within the concept of this invention.

The precooler at the discharge end of the expansion nozzle has a section that conforms with the section of the expansion nozzle to which it is secured by bolts, welding, or the like, not shown. The deposition plate that follows the precooler, may, if preferred, be of a contour that conforms with the section of the discharge end of the precooler.

Figure 13:
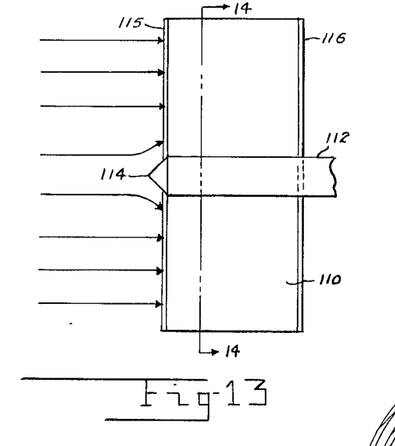
FIG. 13 is a plan view from above of a cylindrical cooler.
Figure 14:
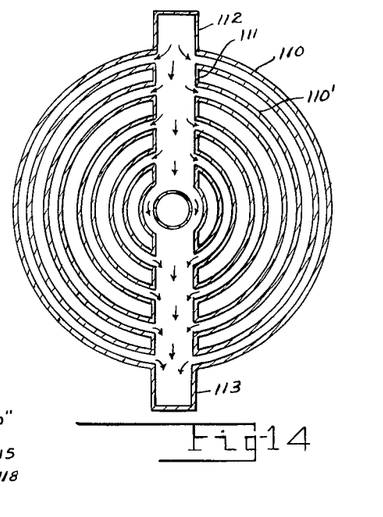
FIG. 14 is a sectional view taken along the line 14—14 of FIG. 13, rotated one quadrant.
Figure 15:
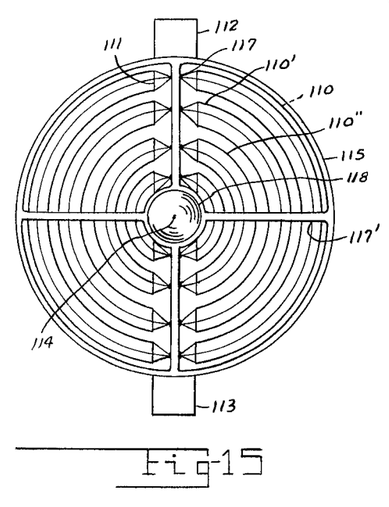
FIG. 15 is a front elevational view of the cylindrical cooler in FIG. 13.

The single stage precooler of circular cross-section is shown in FIGS. 13, 14 and 15 of the drawings. The precooler is shown as a cylinder in plan view from above in FIG. 13, and in cross-section in FIG. 14. An elevational view of the intake end of the cylindrical precooler is shown in FIG. 15.

The cylindrical precooler comprises a desired plurality of circularly extending, thin and continuously hollow vanes 110, 110', etc. The vanes open into and are supported by a diametrically, vertically extending header 111 that in section may be circular, oval, or square, as preferred. The header 111 extends between a liquid hydrogen supply pipe 112 and a discharge pipe 113.

The axially opposite ends of the hollow vanes 110, 110', etc., terminate in small angle apices that minimize the introduction of disturbance in the flow of pulsed atomic and molecular hydrogen gas as it passes through the vanes, as indicated in FIG. 13, by the central vane conical tip 114. The opposite axial ends of the circular vanes 110, 110', etc., are supported by a gas permeable apertured plate or spiders 115 or 116, by being welded to the spider spokes 117, 117', or the like. The radially inner rim 118 of the spider 115 is welded to the base of the central vane conical tip 114. The radially outer rims of the spiders 115 and 116 are welded respectively to the opposite ends of the outermost vane 110.

The single stage precooler that is shown in FIG. 7 of the drawings, is of a square or a rectangular section that matches or conforms with the square or the rectangular right-hand discharge end of the expansion nozzle 46'.

The single stage precooler that is shown in FIG. 7 comprises a desired plurality of straight, horizontally extending hollow vanes 77, 77', etc. The lateral ends of the vanes are supported by, attached to, and open into vertically extending hollow header member parts of the closed ring header 76, 76'. Both the closed ring header 76, 76' and the vanes are narrow. The vanes terminate at their axially front and rear edges in small angles to minimize disturbance in the flow of hydrogen gas around the vanes. Liquid hydrogen at 14° K. is continuously circulated from its input pipe 96 through a compartment between the panels 73 and 75 into the header 76 to its output pipe 78 that opens from the header 76'.

The deposition plate 45' overlies the discharge end of the precooler. The deposition plate 45' is backed by a liquid helium at 4° K. containing compartment between the jackets 72 and 73 fed from the pipe 74. The liquid helium compartment back of the deposition plate 45' is protected from heat absorption by the liquid hydrogen compartment between the jackets 73 and 75 and by additional supplementary compartments, where desired.

The dotted lines before the intake ends of the vanes 77, 77', etc., represent shocks 79 that are in front of the lead ends of the hollow vanes 77, 77', etc., of the precooler. The lead edges of the precooler vanes 77, 77', etc., are designed to convert much of the kinetic energy of the hydrogen flow into thermal energy for rapid heat flow to the precooler.

The individual shocks 79 blend into a normal shock 79' which tends to average out in the subsonic flow downstream of the normal shock. The cooling vanes 77, 77', etc., illustratively are about three inches apart. The collisions of atoms and molecules at the entrance end of the hollow vanes 77, 77', etc., cause the atoms and molecules to bounce back or to be re-emitted at velocities approaching the thermal equilibrium value for the surface. This results in a drastic reduction in the velocity of the re-emitted atoms and thereby produces a corresponding increase in the density and a decrease in the mean free path of the more forward flowing atoms and molecules. The re-emitted or the recoil atoms from one vane go but a short distance before hitting another vane which, in turn, re-emits them toward the first vane, with the results that the atoms and the molecules are given a marked increase in density, an increase in pressure, and an increase in temperature, that are characteristic of crossing a shock front. The thickness of the shock front is not crucial to the production of free radicals. The axial length of the hollow vanes 77, 77', etc., is adjusted to obtain the degree of precooling that is desired.

The alternate pulses of atomic hydrogen and molecular hydrogen are caused to adhere to the surface of the stationary deposition plate 45' as sequential laminations of atomic hydrogen and molecular hydrogen that previously have adhered thereto. The overall dimensions of the precooler are such as to maintain a supply of atomic and molecular hydrogen at about 20° K. or below. The exposed surface of the precooler is adequate to cool down the pulsed supply of atomic and molecular hydrogen and to remove the stagnation heat that is released in the slowing down of the gas by skin friction.

The channels between the precooler hollow vanes 77, 77', etc., are filled with gas of very low density. The sum of the kinetic and of the thermal energy of the gas about equals the thermal energy of the stationary gas in equilibrium with the walls at 20° K. Thus, the atomic hydrogen arrives at the deposition plate 45' with about the equivalent thermal energy of a gas at 20° K.

The rate of build-up of the composite layer on the stationary deposition plate 45' depends on the number of pulses of atomic hydrogen and of molecular hydrogen that arrive at the plate and, hence, it is found to be necessary to fill the spark chamber 62 with hydrogen at a rate that prevents mixing of the admitted hydrogen gas with the tail-off pressure of the previous pulse of atomic hydrogen.

The product 40" in FIG. 7 is removed as before by the edge of the knife blade 55' that functions in the same manner as the corresponding assembly in FIG. 6.

Figure 12:
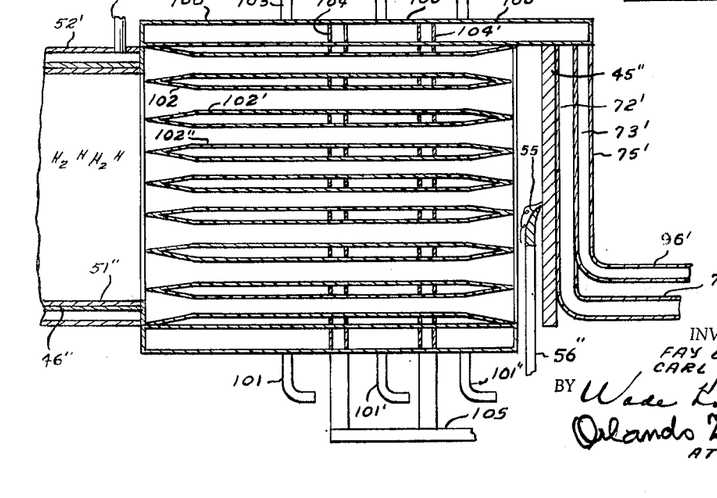
FIG. 12 is a fragmentary axial sectional view of a third modification of the apparatus that embodies a multiple stage precooler ahead of the deposition plate.

In FIG. 12 of the accompanying drawings is shown a modification of the present invention that embodies a multiple-stage precooler that is positioned ahead of the rectangular stationary deposition plate with evacuated separators between the stages.

In FIG. 12 the expansion nozzle 46" is lined as before with a layer 51" that is poisoned to minimize the recombination of atomic hydrogen into molecular hydrogen. The nozzle wall is maintained at a desired low temperature by a coolant which is circulated between the wall of the expansion nozzle and one or more jackets 52', of which the connection 68' is representative.

The multiple-stage precooler broadly comprises a plurality of repetitions of the precooler of FIG. 7. The stages are mutually insulated thermally by shallow dividers that are evacuated to $10^{-5}$ or $10^{-6}$ millimeters of mercury. The precooler first stage is representative of all the stages shown and comprises a vertical header or manifold 100 that receives its cooling liquid from the supply pipe 101 for circulation through the manifold and through the circularly or transversely extending hollow vanes with cross-sections 102, 102', etc., that open laterally into and are attached to and supported by the upright sides of the manifold. The exhaust manifold (not shown) corresponds to 76' in FIG. 7. That fraction of the coolant that undergoes its transition from its liquid to its vapor phase is conducted by the discharge pipe 103 to a compressor, a condenser, and a pump that are not shown, and that return the coolant in its liquid state through the input pipe 101. The shallow evacuated dividers 104, 104', etc., are exhausted by a pipe 105 to the vacuum. Corresponding parts for the sequential stages bear corresponding numerals primed successively.

The stationary deposition plate 45" has a surface on which the successive pulses of atomic hydrogen and molecular hydrogen, that pass through the precooler, solidify in successive laminations. The temperature of the deposition plate is maintained at 4° K. by liquid helium that is continuously circulated between the jackets 72' and 73' from connections such as the connection 74'. The liquid helium container back of the deposition plate 45" is backed up by a desired succession of stepped coolant containing compartments, such illustratively, as multiples of the liquid hydrogen compartment between the jackets 73' and 75' through which liquid hydrogen is circulated through the connection 96'.

The laminated solidified layers of atomic hydrogen and molecular hydrogen that are deposited on the surface of the deposition plate 45" are removed by the edge of the knife blade 56" that extends for the full width of the deposition surface and that is operated by gaseous or liquid helium as described for FIG. 6. The laminated matrix product 40 is entrapped within a compartment such as that described for FIGS. 4 and 6, and is removed as previously described for those particular pieces of apparatus.

It is to be understood that the steps of the method, the laminated atomic hydrogen and molecular hydrogen products and the apparatus that are disclosed herein, have been submitted as being illustrative reductions to practice of the present invention and that corresponding modifications may be made therein for accomplishing comparable results without departing from the spirit and scope of the present invention defined by the claims that appear herein.

We claim:

1. The apparatus comprising a rotatable hollow cylindrical drum containing liquid helium, and channel means conducting separate streams of atomic hydrogen and of molecular hydrogen to the surface of the drum for their solidification thereon.

2. The apparatus comprising a rotatable hollow cylindrical drum containing liquid helium, a first channel conducting atomic hydrogen to adjacent the surface of the drum for its solidification thereon, a second channel conducting molecular hydrogen to adjacent the surface of the drum for its solidification on the atomic hydrogen in providing a solidified laminated product.

3. The apparatus defined in the above claim 2 with means for removing the solidified atomic hydrogen and the solidified molecular hydrogen laminated product from the surface of the drum.

4. The apparatus comprising a deposition plate flat surface maintained at from 1 through 4.2° K. as the temperature of liquid helium, a channel means delivering a hydrogen gas for flow therethrough, a hydrogen gas metering valve means applied to the hydrogen gas flow, and a spark chamber means imparting to the metered gas flow alternate pulses of atomic hydrogen and of molecular hydrogen in the gas flow and directing to adjacent the deposition plate surface alternate pulsations of atomic hydrogen and molecular hydrogen for their solidification on the deposition plate surface as a laminated product.

5. The apparatus comprising within an enclosure a controlled flow of metered hydrogen gas, means converting the hydrogen gas to a sequential flow of pulsated atomic and molecular hydrogen, a flat stationary plate having a deposition surface maintained at from 1 through 4.2° K. as the temperature of liquid helium, and expansion nozzle means conducting and delivering to adjacent the deposition surface of the plate an alternated sequence of gaseous molecular hydrogen and of gaseous atomic hydrogen for their accumulation as a solidified lamination thereon, and scraping means for removing the solidified lamination from the deposition surface.

6. The apparatus defined by the above claim 5 inclusive of a solidified laminated product entrapping compartment, and means for gaining access to the product entrapping compartment for the removal of the product therefrom.

7. The apparatus comprising a hydrogen gas flow supply means, a hydrogen gas metering valve means applied to the hydrogen gas flow, a spark chamber means imparting to the meter gas flow alternate pulses of atomic hydrogen and of molecular hydrogen, an expansion nozzle for the conduction and the gradual retardation in flow rate of the sequential flow axially of the expansion nozzle of alternated pulses of gaseous atomic hydrogen and of gaseous molecular hydrogen, a precooler means into which the expansion nozzle discharges, and deposition plate means to which the precooler means discharges the atomic hydrogen alternated with the molecular hydrogen for solidification as a laminated matrix on the deposition plate.

8. The apparatus comprising a hydrogen gas flow supply means, a hydrogen gas metering valve means applied to the hydrogen gas flow, a spark chamber means imparting to the metered gas flow alternate pulses of atomic hydrogen and of molecular hydrogen, an expansion nozzle for the conduction and for the gradual retardation in flow rate of the sequential flow axially of the expansion nozzle of alternated pulses of gaseous atomic hydrogen and of gaseous molecular hydrogen, a multiple stage precooler with insulating evacuated compartments interposed between the cooling stages into which precooler the expansion nozzle discharges, and a deposition plate means to which the precooler means discharges the atomic hydrogen alternated with the molecular hydrogen for solidification as a laminated matrix on the deposition plate.

References Cited by the Examiner

UNITED STATES PATENTS

| | | | |
|---|---|---|---|
| 652,058 | 6/1900 | Tripler | 62—36 |
| 2,063,770 | 12/1936 | Taylor | 62—346 |
| 2,420,306 | 4/1947 | Filbert | 149—14 |
| 2,422,043 | 6/1947 | Rolland | 149—14 |
| 2,432,659 | 12/1947 | Criswell | 118—301 X |
| 2,608,838 | 9/1952 | Rupp | 62—10 |
| 2,672,842 | 3/1954 | Winters | 118—301 X |
| 2,889,687 | 6/1959 | Ishizuka | 62—10 |
| 2,895,303 | 7/1959 | Streeter. | |
| 3,048,021 | 8/1962 | Coles et al. | 62—36 |
| 3,112,072 | 11/1963 | Malone | 239—132 X |

NORMAN YUDKOFF, *Primary Examiner.*

L. DEWAYNE RUTLEDGE, *Examiner.*

V. W. PRETKA, J. C. JOHNSON, A. C. BOWEN,
*Assistant Examiners.*